(12) United States Patent
Ryu et al.

(10) Patent No.: US 9,398,243 B2
(45) Date of Patent: Jul. 19, 2016

(54) DISPLAY APPARATUS CONTROLLED BY MOTION AND MOTION CONTROL METHOD THEREOF

(71) Applicant: SAMSUNG ELECTRONICS CO., LTD., Suwon-si (KR)

(72) Inventors: Hee-seob Ryu, Hwaseong-si (KR); Seung-kwon Park, Yongin-si (KR); Seong-hun Jeong, Suwon-si (KR); Mikiyas Teshome, Suwon-si (KR); Sang-yoon Kim, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/617,663

(22) Filed: Feb. 9, 2015

(65) Prior Publication Data

US 2015/0156441 A1 Jun. 4, 2015

Related U.S. Application Data

(63) Continuation of application No. 13/334,155, filed on Dec. 22, 2011.

(30) Foreign Application Priority Data

Jan. 6, 2011 (KR) .................. 10-2011-0001526

(51) Int. Cl.
*H04N 5/44* (2011.01)
*H04N 21/4223* (2011.01)
(Continued)

(52) U.S. Cl.
CPC .............. *H04N 5/4403* (2013.01); *G06F 3/005* (2013.01); *H04N 21/4223* (2013.01); *H04N 21/4383* (2013.01); *H04N 21/44218* (2013.01)

(58) Field of Classification Search
CPC ............ H04N 5/4403; H04N 21/4223; H04N 21/4383; H04N 21/44218; H04N 5/44; G06F 3/005
USPC .......... 348/734, 155, 169, 700; 345/156–157, 345/158, 145, 146
See application file for complete search history.

(56) References Cited

U.S. PATENT DOCUMENTS

| 5,594,469 A | 1/1997 | Freeman et al. |
| 5,767,457 A | 6/1998 | Gerpheide et al. |

(Continued)

FOREIGN PATENT DOCUMENTS

| CN | 101106668 A | 1/2008 |
| CN | 1 01 4371 24 A | 5/2009 |

(Continued)

OTHER PUBLICATIONS

Communication, dated Mar. 29, 2012, issued by the European Patent Office in corresponding European Application No. 12150199.3.

(Continued)

*Primary Examiner* — Trang U Tran
(74) *Attorney, Agent, or Firm* — Sughrue Mion, PLLC (57) ABSTRACT

A display apparatus is provided, which includes a motion recognition unit which recognizes a motion of an object that is located outside the display device, and a control unit which, when the motion of the object is recognized, determines a change amount that varies according to a motion speed or a motion distance of the object, and performs an operation which corresponds to the motion of the object according to the change amount. Accordingly, channel change or page shift can be easily performed.

10 Claims, 6 Drawing Sheets

(51) Int. Cl.
*H04N 21/442* (2011.01)
*H04N 21/438* (2011.01)
*G06F 3/00* (2006.01)

(56) References Cited

U.S. PATENT DOCUMENTS

| | | | |
|---|---|---|---|
| 6,191,773 | B1 | 2/2001 | Maruno et al. |
| 6,351,222 | B1 | 2/2002 | Swan et al. |
| 6,498,628 | B2 | 12/2002 | Iwamura |
| 6,952,803 | B1 | 10/2005 | Bloomberg et al. |
| 7,259,756 | B2 | 8/2007 | Park et al. |
| 7,702,130 | B2 | 4/2010 | Im et al. |
| 7,886,229 | B2 | 2/2011 | Pachet |
| 7,911,447 | B2 | 3/2011 | Kouno |
| 7,983,475 | B2 | 7/2011 | Aoki et al. |
| 8,249,334 | B2 | 8/2012 | Berliner et al. |
| 9,164,578 | B2 | 10/2015 | Matsubara et al. |
| 2001/0042245 | A1 | 11/2001 | Iwamura |
| 2003/0233237 | A1 | 12/2003 | Garside et al. |
| 2004/0189720 | A1 | 9/2004 | Wilson et al. |
| 2006/0013440 | A1 | 1/2006 | Cohen et al. |
| 2006/0136846 | A1 | 6/2006 | Im et al. |
| 2006/0210163 | A1 | 9/2006 | Garside et al. |
| 2007/0259716 | A1 | 11/2007 | Mattice et al. |
| 2008/0013921 | A1 | 1/2008 | Kim |
| 2008/0030459 | A1 | 2/2008 | Kouno |
| 2008/0126937 | A1 | 5/2008 | Pachet |
| 2008/0134102 | A1 | 6/2008 | Movold et al. |
| 2008/0181456 | A1 | 7/2008 | Aoki et al. |
| 2008/0221882 | A1 | 9/2008 | Bundock et al. |
| 2008/0225041 | A1 | 9/2008 | El Dokor et al. |
| 2008/0259031 | A1 | 10/2008 | Yoshino |
| 2009/0033616 | A1 | 2/2009 | Miyagi |
| 2009/0070109 | A1 | 3/2009 | Didcock et al. |
| 2009/0217211 | A1 | 8/2009 | Hildreth et al. |
| 2009/0286601 | A1 | 11/2009 | Rubio et al. |
| 2009/0319894 | A1 | 12/2009 | Markiewicz et al. |
| 2010/0034457 | A1 | 2/2010 | Berliner et al. |
| 2010/0079677 | A1 | 4/2010 | Matsubara et al. |
| 2010/0131294 | A1 | 5/2010 | Venon et al. |
| 2010/0210359 | A1 | 8/2010 | Krzeslo et al. |
| 2010/0235786 | A1 | 9/2010 | Maizels et al. |
| 2010/0275159 | A1 | 10/2010 | Matsubara et al. |
| 2010/0277470 | A1 | 11/2010 | Margolis |
| 2010/0295781 | A1 | 11/2010 | Alameh et al. |
| 2011/0001813 | A1 | 1/2011 | Kim et al. |
| 2011/0029869 | A1 | 2/2011 | McLennan |
| 2011/0035666 | A1 | 2/2011 | Geisner et al. |
| 2011/0053641 | A1 | 3/2011 | Lee et al. |
| 2011/0093820 | A1 | 4/2011 | Zhang et al. |
| 2011/0105190 | A1 | 5/2011 | Cha et al. |
| 2011/0161889 | A1 | 6/2011 | Scheer et al. |
| 2011/0173574 | A1 | 7/2011 | Clavin et al. |
| 2011/0210931 | A1 | 9/2011 | Shai |
| 2011/0304550 | A1 | 12/2011 | Romera Jolliff et al. |
| 2011/0313768 | A1 | 12/2011 | Klein et al. |
| 2012/0096345 | A1 | 4/2012 | Ho et al. |
| 2012/0105257 | A1 | 5/2012 | Murillo et al. |
| 2012/0165074 | A1 | 6/2012 | Soldan et al. |
| 2012/0249767 | A1 | 10/2012 | Matsubara et al. |
| 2012/0306772 | A1 | 12/2012 | Tan et al. |
| 2013/0036137 | A1 | 2/2013 | Ollis et al. |
| 2013/0067411 | A1 | 3/2013 | Kataoka et al. |
| 2013/0120282 | A1 | 5/2013 | Kukulski |
| 2013/0246063 | A1 | 9/2013 | Teller |
| 2016/0018903 | A1 | 1/2016 | Matsubara et al. |

FOREIGN PATENT DOCUMENTS

| | | | |
|---|---|---|---|
| CN | 201294582 | Y | 8/2009 |
| CN | 101558367 | A | 10/2009 |
| CN | 101657825 | A | 2/2010 |
| CN | 1 01 751 206 | A | 6/2010 |
| EP | 1 645 944 | A1 | 4/2006 |
| EP | 2 180 395 | A1 | 4/2010 |
| JP | H 8-211979 | A | 8/1996 |
| JP | H 8-315154 | A | 11/1996 |
| JP | H 11-44703 | A | 2/1999 |
| JP | 2004246814 | A | 9/2004 |
| JP | 2008-516322 | A | 5/2008 |
| JP | 2008-162376 | A | 7/2008 |
| JP | 2008-269174 | A | 11/2008 |
| JP | 201079771 | A | 4/2010 |
| JP | 2010182014 | A | 8/2010 |
| JP | 2010250757 | A | 11/2010 |
| JP | 2010257093 | A | 11/2010 |
| KR | 10-2006-0070280 | A | 6/2006 |
| KR | 10-2010-0052378 | A | 5/2010 |
| KR | 10-2010-0056838 | A | 5/2010 |
| WO | 03010652 | A1 | 2/2003 |
| WO | 2006/009516 | A1 | 1/2006 |
| WO | 2006003869 | A1 | 1/2006 |
| WO | 2007/097548 | A1 | 8/2007 |
| WO | 2007/138393 | A2 | 12/2007 |
| WO | 2010006087 | A1 | 1/2010 |
| WO | 2010/138952 | A2 | 12/2010 |
| WO | 2011066343 | A2 | 6/2011 |

OTHER PUBLICATIONS

Wu-chun Feng, "An Integrated Multimedia Environment for Speech Recognition Using Handwriting and Written Gestures", IEEE, Proceedings of the 36th Hawaii International Conference on System Sciences—2003, pp. 1-10, 0-7695-1874-5/03.
Office Action for Mexican Patent Application No. MX / a / 2013/007942 mailed Mar. 26, 2014.
Office Action for U.S. Appl. No. 13/315,915 mailed Apr. 7, 2014.
Office Action for U.S. Appl. No. 13/335,200 mailed Apr. 22, 2014.
Office Action for Chinese Patent Application No. 201210005642.1 mailed on Jun. 25, 2014.
Office Action for U.S. Appl. No. 13/329,505 mailed Jun. 26, 2014.
Office Action for U.S. Appl. No. 13/315,915 mailed Aug. 6, 2014.
Office Action for Korean Patent Application No. 10-2011-0001522 mailed on Aug. 11, 2014.
Office Action for U.S. Appl. No. 13/531,197 mailed Aug. 25, 2014.
Office Action for Korean Patent Application No. 10-2014-0081937 mailed Aug. 29, 2014.
Communication dated Sep. 9, 2014 issued by the Mexican Patent Office in counterpart Mexican Patent Application No. MX/a/2013/007942.
Communication dated Dec. 22, 2014, issued by the State Intellectual Property Office of P.R. China in counterpart Chinese Application No. 201210005274.0.
Communication dated Jan. 5, 2015, issued by the United States Patent and Trademark Office in counterpart U.S. Appl. No. 13/531,197.
Communication dated Jan. 23, 2014, from the Korean Intellectual Property Office in a counterpart Korean Application No. 10-2011-0115084.
USPTO Office Action dated Mar. 21, 2014 issued in co-pending U.S. Appl. No. 13/531,197.
USPTO Non Final Office Action dated Mar. 18, 2013 issued in U.S. Appl. No. 13/334,155.
USPTO Final Office Action dated Oct. 18, 2013 issued in U.S. Appl. No. 13/334,155.
USPTO Non Final Office Action dated Jan. 30, 2014 issued in U.S. Appl. No. 13/334,155.
USPTO Notice of Allowance mailed May 27, 2014 issued in U.S. Appl. No. 13/334,155.
USPTO Notice of Allowance mailed Aug. 1, 2014 issued in U.S. Appl. No. 13/334,155.
USPTO Notice of Allowance mailed Dec. 18, 2014 issued in U.S. Appl. No. 13/334,155.
USPTO Final Office Action dated Jan. 29, 2015 issued in U.S. Appl. No. 13/315,915.
USPTO Non Final Office Action dated Feb. 5, 2015 issued in U.S. Appl. No. 13/329,505.
USPTO Notice of Allowance mailed Oct. 23, 2014 issued in U.S. Appl. No. 13/334,155.

(56) References Cited

OTHER PUBLICATIONS

Communication issued Jun. 30, 2015, issued by the Korean Intellectual Property Office in counterpart Korean Patent Application No. 10-2014-0081937.
Communication issued Aug. 25, 2015, issued by the United States Patent and Trademark Office in counterpart U.S. Appl. No. 13/329,505.
Communication issued Sep. 21, 2015, issued by the United States Patent and Trademark Office in counterpart U.S. Appl. No. 13/531,197.
Communication issued Sep. 22, 2015, issued by the United States Patent and Trademark Office in counterpart U.S. Appl. No. 13/315,915.
Communication issued Sep. 24, 2015, issued by the United States Patent and Trademark Office in counterpart U.S. Appl. No. 13/334,155.
Communication dated Mar. 23, 2015 issued by the European Patent Office in counterpart European Patent Application No. 11193818.9.
Communication dated Apr. 1, 2015 issued by the Mexican Patent Office in counterpart Mexican Patent Application No. MX/a/2013/007942.
Communication dated Apr. 27, 2015 issued by the Korean Intellectual Property Office in counterpart Korean Patent Application No. 10-2011-0001522.
Communication dated May 5, 2015 issued by the United States Patent and Trademark Office in counterpart U.S. Appl. No. 13/531,197.
Communication dated May 5, 2015 issued by the United States Patent and Trademark Office in counterpart U.S. Appl. No. 13/315,915.
Communication dated May 7, 2015 issued by the European Patent Office in counterpart European Patent Application No. 12 161 348.3.
Communication dated May 22, 2015 issued by the State Intellectual Property Office of the People's Republic of China in counterpart Chinese Patent Application No. 201210005274.0.
Communication dated Jun. 3, 2015 issued by the United States Patent and Trademark Office in counterpart U.S. Appl. No. 13/335,200.
Communication issued Sep. 8, 2015, issued by the Mexican Patent Office in counterpart Mexican Patent Application No. MX/a/2013/007942.
Communication dated Dec. 10, 2015, issued by the United States Patent and Trademark Office in counterpart U.S. Appl. No. 13/335,200.
Communication dated Jan. 26, 2016, issued by the Japanese Intellectual Property Office in counterpart Japanese Application No. 2012-000696.
Communication dated Feb. 8, 2016, issued by the United States Patent and Trademark Office in counterpart U.S. Appl. No. 13/531,197.
Communication dated Feb. 16, 2016, issued by the Japanese Intellectual Property Office in counterpart Japanese Application No. 2012-000695.

DISPLAY APPARATUS CONTROLLED BY MOTION AND MOTION CONTROL METHOD THEREOF

PRIORITY

This is a continuation of U.S. application Ser. No. 13/334,155, filed Dec. 22, 2011, which claims priority from Korean Patent Application No. 10-2011-0001526, filed on Jan. 6, 2011, in the Korean Intellectual Property Office, the disclosures of which are incorporated herein by reference in their entirety.

BACKGROUND

1. Field

Aspects of the exemplary embodiments of the present disclosure relates to a display apparatus and a motion control method thereof, and more particularly to a display apparatus and a motion control method thereof, which can differently control operation performance.

2. Description of the Related Art

With the development of electronic technology, various kinds of electronic appliances have been newly developed and released. The newest products adopt the newest technologies so that a user can use the corresponding products more conveniently and effectively. Examples of such technologies may include motion recognition technology, voice recognition technology, and the like.

Among them, the motion recognition technology means technology capable of sensing a user's motion using a motion sensor and the like and using the result of the motion sensing.

A user can conveniently use such motion recognition technologies. However, if a motion or voice command is not accurately input, an unintended function may be performed or a command input itself may not be made. As a consequence, a user may need to repeat such a command input several times with inconvenience.

Accordingly, it is preferable for a user to set a motion that the user does not frequently make in ordinary times or a motion having high discrimination as a command rather than a motion that the user knowingly or unknowingly makes frequently.

On the other hand, a display device displays menus, which can be controlled in a predetermined unit (for example, one by one), such as channel change, volume control, page shift, other attribute change, and the like. In order to control plural units of such a menu at the same time, it is required to make the corresponding motion plural times to cause inconvenience in use.

For example, in the case of the channel change, if a user moves a user's hand in one direction in front of the display device, the channel is changed according to the movement direction to select the next channel. Typically, the channel change may be made in one channel unit. That is, if a user takes a motion in which a user moves a user's hand to the left while viewing a broadcast on channel number 10, channel number 11 is selected and a broadcast on channel number 11 is displayed. Accordingly, in the case where a user intends to select channel number 50 while viewing a broadcast on channel number 10, it is required for the user to take the same motion forty times to cause inconvenience in use.

As described above, if the total number of channels is large or content has a large number of pages, a user will need to take a large number of motions to receive a desired service using motion recognition technology, and the user may easily feel arm fatigue.

SUMMARY

The present disclosure has been made to address at least the above problems and/or disadvantages and to provide at least the advantages described below. Accordingly, an aspect of the present disclosure provides a display apparatus and a motion control method thereof, which can control an operation performance unit.

An exemplary embodiment of the present disclosure provides a display apparatus, which includes a motion recognition unit recognizing a motion of an object that is located outside the display device; and a control unit performing an operation which corresponds to the motion of the object as much as a change amount that is differently determined according to a motion speed or a motion distance of the object when the motion of the object is recognized.

The display apparatus according to an exemplary embodiment of the present disclosure may further include a tuner unit selecting a broadcasting channel; and a signal processing unit processing a broadcasting signal that is received through the broadcasting channel selected by the tuner unit and an output unit outputting the broadcasting signal that is processed at the signal processing unit; wherein if a first motion that instructs a broadcasting channel change is recognized, the control unit controls the tuner unit to change and select the broadcasting channel in a motion direction of the first motion as much as the change amount that is differently determined according to the motion speed or the motion distance of the first motion.

On the other hand, the control unit may change the broadcasting channel by a first change amount if the motion speed or the motion distance is equal to or higher than a predetermined threshold value, while the control unit may change the broadcasting channel by a second change amount that is smaller than the first change amount if the motion speed or the motion distance is lower than the threshold value.

Also, the control unit may control the change amount so that the change amount is increased gradually or by stages in proportion to the motion speed or the motion distance.

In another exemplary embodiment of the present disclosure, the display apparatus may further include an output unit displaying content that includes a plurality of pages. Here, if a second motion that instructs a page shift is recognized, the control unit controls the output unit to shift the page in a motion direction of the second motion as much as the change amount that is differently determined in proportion to the motion speed or the motion distance of the second motion.

Also, the control unit may shift the content page by a first change amount if the motion speed or the motion distance is equal to or higher than the threshold value, while the control unit may shift the content page by a second change amount that is smaller than the first change amount if the motion speed or the motion distance is lower than the threshold value.

Also, the control unit may control the change amount so that the change amount is increased gradually or by stages in proportion to the motion speed or the motion distance.

An exemplary embodiment of the present disclosure provides a motion control method of a display apparatus, which includes recognizing a motion of an object that is located outside the display device; determining a change amount according to a motion speed or a motion distance of the object; and performing an operation which corresponds to the motion of the object as much as the change amount.

The motion control method according to an exemplary embodiment of the present disclosure may further include selecting a broadcasting channel and outputting broadcasting data; wherein if the recognized motion is a first motion for instructing a broadcasting channel change, the performing step changes and selects the broadcasting channel in a motion direction of the first motion as much as the change amount that is differently determined according to dimension of the motion speed or the motion distance of the first motion.

On the other hand, the performing step may change the broadcasting channel by a first change amount if the motion speed or the motion distance is equal to or higher than a predetermined threshold value, while the performing step may change the broadcasting channel by a second change amount that is smaller than the first change amount if the motion speed or the motion distance is lower than the threshold value.

The step of determining the change amount may control the change amount so that the change amount is increased gradually or by stages in proportion to the motion speed or the motion distance.

On the other hand, the motion control method according to an exemplary embodiment of the present disclosure may further include displaying content that includes a plurality of pages. Here, if the recognized motion is a second motion for instructing a page shift, the performing step shifts the page in a motion direction of the second motion as much as the change amount that is controlled in proportion to the motion speed or the motion distance of the second motion.

Also, the performing step may shift the content page by a first change amount if the motion speed or the motion distance is equal to or higher than the threshold value, while the performing step may shift the content page by a second change amount that is smaller than the first change amount if the motion speed or the motion distance is lower than the threshold value.

Also, the step of determining change amount may control the change amount so that the change amount is increased gradually or by stages in proportion to the motion speed or the motion distance.

According to various exemplary embodiments of the present disclosure, a user can perform motion control in different operation performance units by taking a motion as making attributes such as a motion speed and a motion distance different.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF THE EXEMPLARY EMBODIMENTS

Hereinafter, exemplary embodiments of the present disclosure are described in detail with reference to the accompanying drawings. However, the present disclosure is not restricted or limited to such exemplary embodiments. For reference, in explaining the present disclosure, well-known functions or constructions will not be described in detail so as to avoid obscuring the description with unnecessary detail.

Figure 1:
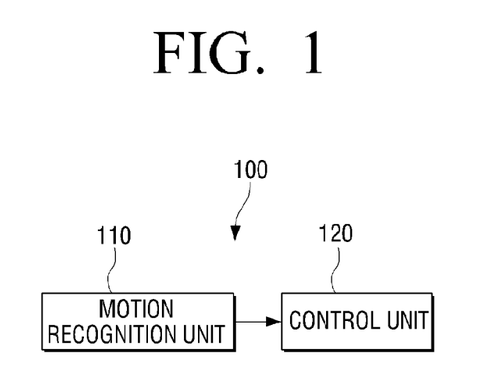
FIG. 1 is a block diagram illustrating a configuration of a display apparatus according to an exemplary embodiment of the present disclosure.

FIG. 1 is a block diagram illustrating the configuration of a display apparatus according to an exemplary embodiment of the present disclosure. The display apparatus may be implemented as a TV, a portable phone, a monitor, a notebook PC, an electronic frame, an electronic book, a PDA, navigation, and the like.

Referring to FIG. 1, the display device 100 includes a motion recognition unit 110 and a control unit 120.

The motion recognition unit 110 includes at least one processor and is configured to recognize a motion of an object that is located outside the display device 100. Specifically, the motion recognition unit 110 senses the motion of a user who intends to use the display apparatus 100 and recognizes what motion has been taken.

For this, the motion recognition unit 110 may include a photographing means such as a camera. The motion recognition unit 110 photographs a user or the like who is present within a photographing range of the photographing means, recognizes what motion the user has taken by analyzing the photographed image data, and provides the result of the photographing to the control unit 120.

The control unit 120 includes at least one processor and performs an operation that corresponds to the motion recognized by the motion recognition unit 110. Here, the operation performed by the control unit 120 may be power on/off of the display apparatus 100, execution of various kinds of functions provided by the display apparatus 100, attribution control, and the like.

In particular, the control unit 120 may perform an operation, which is controlled in a predetermined unit or increment, such as a channel, volume, menu for setting various kinds of attributes, page shift, or the like. In performing such an operation, the control unit 120 may apply the size of the operation performance unit or increment differently in consideration of the characteristics of a user's motion.

Specifically, various values, such as a motion speed, a motion distance, motion strength, a type of object that takes a motion, the size of an object, and the like, may be considered as the characteristics of the motion. The control unit 120 controls the size of the performance unit or increment differently in accordance with the degree of change of the characteristics. That is, the control unit determines the change amount based on the degree of change of the motion characteristics, and performs an operation corresponding to the determined change amount.

As a first example, the control unit may determine the change amount by stages by comparing the motion speed or the motion distance with a threshold value. Specifically, explanation will be made in consideration of a case where a motion that instructs the channel change is recognized.

In this case, the control unit 120 compares the speed of the motion that instructs the channel change with a predetermined threshold value, that is, the threshold speed. As a result, if the motion speed is equal to or higher than the threshold value, the control unit 120 performs the channel change in plural channel units. For convenience in explanation, it is assumed that the change amount when the motion speed is equal to or higher than the threshold value is a first change amount. The first change amount may be set as a stored default or set and adjusted by user input. For example, the channel number of 5 or 10 may be used as the first change amount. That is, if a user, who is viewing a broadcast of channel number 20, rapidly swings a hand from right to left in a state where the channel number of 10 is determined as the first change amount, the channel change is made in the direction, and the channel is immediately changed to channel number 30. The number of channel change units may not be limited to 10, but may be changed. That is, the number of channel change units may be 5 or 20.

On the other hand, if the motion speed is lower than the predetermined threshold value, the control unit performs the channel change as much as a second change amount. The second change amount may also be set as a stored default or set and adjusted by user input, and it is general to perform the channel change in one channel unit in the same manner as the existing channel change.

On the other hand, a minimum threshold value for filtering a meaningless motion may be set and used. That is, if the motion is made at a speed that is lower than a first threshold value that is the minimum threshold value, the motion is disregarded, and no operation is performed. If the motion is made at a speed that is equal to or higher than the first threshold value and is smaller than a second threshold value, the channel is changed one by one. By contrast, if the motion is made at a speed that is higher than the second threshold value, the channel is changed by a predetermined number of units, for example, 5, 10, or 20 at a time.

Also, the motion control may be performed using a plurality of threshold values that includes threshold values that are higher than the second threshold value (e.g., a third threshold value, etc.). In this case, the channel change amount may be changed according to the motion speed range. That is, if the motion is performed at a speed that is equal to or higher than the second threshold value and is smaller than a third threshold value, the channel change amount may be set to 5, if the motion is performed at a speed that is equal to or higher than the third threshold value and is lower than a fourth threshold value, the channel change amount may be set to 10, and if the motion is performed at a speed that is equal to or higher than the fourth threshold value, the channel change amount may be set to 20. Accordingly, channel change amount may be determined by a comparison result with various threshold values.

In addition to the channel change, the threshold values may be applied to a page shift in a similar manner. That is, if the motion that instructs the page shift is performed at a speed that is lower than a threshold value, that is, a threshold speed in a state where a user is viewing content that includes a plurality of pages, the page shift may be performed in a predetermined page unit, for example, of one page unit.

On the other hand, in a similar manner as described above, a minimum threshold value may be used to filter a meaningless motion. Also, a plurality of threshold values may be applied to control the change amount of the page shift in multi-stages. For example, if the motion is performed at a speed that is equal to or higher than the first threshold value and is lower than a second threshold value, the page shift may be performed in one page unit, and if the motion is performed at a speed that is equal to or higher than the second threshold value and is lower than a third threshold value, the page shift may be performed in 5 page units. Also, if the motion is performed at a speed that is equal to or higher than the third threshold value and is lower than a fourth threshold value, the page shift may be performed in 10 page units, and if the motion is performed at a speed that is equal to or higher than the fourth threshold value, the page shift may be performed in 20 page units.

In the description, for convenience in explanation, a motion for channel change is called a first motion, and a motion for page shift is called a second motion according to an exemplary embodiment.

According to a second exemplary embodiment, the change amount may be gradually changed according to the motion speed or the motion distance.

For example, in the case of the channel change, if the motion that instructs the channel change is performed below a reference speed, the control unit 120 performs the channel change in one channel unit. By contrast, if the motion that instructs the channel change becomes faster than the reference speed, the change amount is gradually increased in proportion to a difference between the speeds. That is, the change amount becomes in linear proportion to the level of the speed, and the channel change operation may be performed in two to n channel units.

In the case of the page shift, the change amount may be determined in the same manner. That is, if the speed is normal, the page shift is performed in one page unit, if the speed is a little bit fast, the page shift is performed in two page units, and if the speed gets faster, the page shift may be performed by 3, 4, 5, . . . n page units.

On the other hand, although the channel change and the page shift have been exemplified as described above, it is also possible that the operation is performed in different change amounts based on the motion speed or the motion distance in controlling output attributes, such as volume, luminance, sharpness, color balance, and the like.

Figure 2:
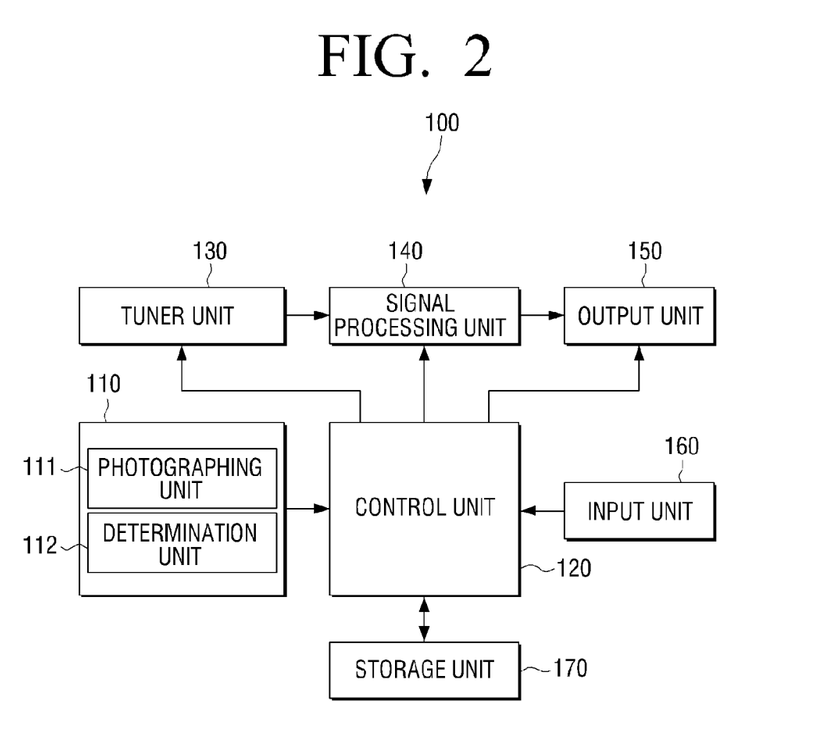
FIG. 2 is a block diagram illustrating a detailed configuration of a display apparatus according to various exemplary embodiments of the present disclosure.

FIG. 2 is a block diagram illustrating the detailed configuration of a display apparatus according to various exemplary embodiments of the present disclosure. Referring to FIG. 2, the display apparatus includes a tuner unit 130, a signal processing unit 140, an output unit 150, an input unit 160, a storage unit 170, and the like, in addition to the motion recognition unit 110 and the control unit 120.

The tuner unit 130 selects a broadcasting signal channel, receives a corresponding broadcasting signal, and provides a received broadcasting signal to the signal processing unit 140 through down-converting.

The signal processing unit 140 performs signal processing, such as encoding, equalizing, decoding, scaling, and the like, with respect to a signal provided from the tuner unit 130 to provide the processed signal to the output unit 150.

The output unit 150 is configured to output an image signal and a voice signal processed by the signal processing unit 140 using output elements such as a display unit, a speaker, and the like.

The input unit 160 is configured to receive a user selection signal according to operations of keys provided in a main body of the electronic appliance 100 or keys provided in an external remote controller. Specifically, the input unit 160 may include a keypad and an IR signal reception lamp.

The storage unit 170 is configured to store various kinds of programs used in the display apparatus or data. Specifically, the storage unit 170 may store information on various kinds of motions set for the motion control and operations that match the motions, respectively.

For example, in the storage unit 170, the following database may be stored.

TABLE 1

| Motion | Operation |
| --- | --- |
| Push motion | Motion recognition mode start |
| Finish motion | Motion recognition mode finish |
| Moving motion | Cursor or focus movement |
| Swing motion | Page or channel change |
| Shake motion | Upper page or previous page shift |
| Hold | Selection |

In Table 1, the push motion means an operation that a user who is located in front of the display device 100 pushes a hand in the direction of the display device 100. If the push motion is recognized, the control unit 120 recognizes the following motions that are performed thereafter, and performs corresponding operations.

The finish motion means a motion for finishing a motion recognition mode. The finish motion may be diversely determined. As an example, if an object is a user's palm of the hand, a motion that the object comes in contact with the user's body or another object may be the finish motion so that the palm of the hand is not recognized any further. This will be described later together with the drawings.

The moving motion means a motion to move an object such as the palm of the hand in one direction. If the moving motion is performed, the control unit 120 moves a cursor or a menu focus state according to the direction and speed of the moving object.

The swing motion means a motion to swing a hand, which is held out in the direction of the display apparatus 100, in one direction. The control unit 120 changes the current page or the current channel to the next page or the next channel.

The shake motion means a motion to shake a hand held out in the direction of the display apparatus 100. In other words, it is also called a wave motion. If the shake motion is recognized, the control unit 120 may shift the currently displayed page to the previous page or to the previous broadcasting scene, and if an upper page of the current page exists, the control unit 120 may perform the shift operation to the upper page.

In addition, the hold means a motion to hold the hand motionlessly over a predetermined time. If the hold is performed in a state where a cursor or focus is located on a specified menu, the control unit 120 recognizes that the corresponding menu has been selected, and selects and performs the corresponding function.

The above-described matching relationship between the motion and the operation is merely exemplary, and the matching relationship may be changed according to circumstances. Also, diverse types of motions, such as motions to draw a circle, other characters, numerals, or symbols, may be added, and a part of the motions described in the table may be omitted.

On the other hand, the remaining motions, except for the push motion, the finish motion, and the hold motion among the above-described motions, may be performed with different change amounts according to the speed or moving range of the motions.

That is, in the case of the moving motion, if the motion is performed faster, the cursor or focus movement amount or speed may become faster. If the swing motion becomes faster or is performed in a wider range, as described above, the page or channel change amount may be further increased. In the shake motion, the shift amount may also be increased according to the shake speed or shake width in the same manner.

On the other hand, in the storage unit 170, information on an object for motion recognition may be separately stored. The information on an object may be a shape or size of an object, and may be appropriately changed by a user. As described above, in the case where the palm of the user hand is used as an object, the user may photograph the palm of the user's hand in advance through a motion recognition unit 110, and may register information on the shape and the size of the palm of the hand in the storage unit 170. Accordingly, other users whose object registration has not been made may be unable to perform the motion recognition control. Accordingly, only the user may have the authority to use or control the display apparatus 100.

In another exemplary embodiment, the object-related information that is stored in the storage unit 170 may be determined by default and stored in the storage unit 170 when the display apparatus 100 is manufactured, and thus a user may be unable to change the object-related information.

On the other hand, although not illustrated in FIG. 2, in the case where the display apparatus 100 supports a voice input mode, a voice input unit may be further included. The voice input unit (not illustrated) is configured to receive voice that a user pronounces. As an example, if a word recognition technology is used, the voice input unit may include a microphone unit collecting voice inputs, an analysis unit extracting a feature by performing frequency analysis or the like with respect to the collected voice inputs, a phoneme recognition unit recognizing a consonant and a vowel by performing segmentation of the voice signal using the extracted feature, and a word recognition unit extracting a word by combining the recognized consonant and vowel based on a word dictionary.

In another exemplary embodiment, the object-related information is not stored in the storage unit 170 in advance, and a portion of photographed image data in which a push motion is first taken is traced to perform only the operation according to the motion of the portion. Accordingly, in an environment where a plurality of users view the display apparatus together, any thoughtless control is prevented from being performed.

On the other hand, referring to FIG. 2, the motion recognition unit 110 includes a photographing unit 111 and a determination unit 112.

The photographing unit 111 includes a camera that photographs the front of the screen of the display apparatus 100. The camera receives light reflected from various kinds of objects put in front of the camera, and generates photographed image data. As in the above-described exemplary embodiment, if recognition of a push motion is required, the photographing unit 111 may use a three-dimensional (3D) depth camera. The 3D depth camera radiates infrared rays, and measures a return time of the infrared rays that reach an object and then returns to calculate a distance to the object. An image obtained from the depth camera is output with gray level, and coordinate values of width, length, distance, and the like, are expressed for each pixel. That is, the photographed image data having depth information for each pixel is generated.

The determination unit 112 recognizes the motion of the object by analyzing the photographed image data. If the motion recognition mode starts by detecting the push motion as in the above-described exemplary embodiment, the determination unit 112 traces the moving state of the object for which the push motion has been performed. Specifically, the determination unit 112 searches for a pixel group that corresponds to the object, and determines whether depth information of the corresponding pixel group has been changed. In this case, if it is determined that the object retreats away from the electronic appliance, the determination unit 112 determines that the mode is not the push mode, while if it is determined that the object approaches the electronic appliance, the determination unit 112 determines that the mode is the push mode.

In another exemplary embodiment, the determination unit 112 determines whether a portion of the photographed image data, in which the depth information has been changed, is present. If it is determined that the depth information has been changed and the object has moved in the Z-axis direction, the determination unit 112 can immediately determine that the push motion has been performed. In this case, if pre-registered object-related information is present, the determination unit 112 compares the size and the shape of the pixel group of which the depth information has been changed with the registered object-related information to determine the similarity between them. If it is determined that there is the similarity between them to the extent that they match each other, the determination unit 112 determines that the push motion has been performed.

If the push motion is recognized and the motion recognition mode starts, the control unit 120 confirms the moving distance of the object for which the push motion has been performed by comparing respective frames provided from the photographing unit 111 with each other, and analyzes an attribute such as the motion speed or the motion distance. Such analysis may be performed by the determination unit 112 according to the exemplary embodiments, and in the following description, it is assumed that the control unit 120 performs the analysis.

As described above, the control unit 120 controls the constituent elements, such as the tuner unit 130, the signal processing unit 140, the output unit 150, and the like, so that the constituent elements perform operations with different change amounts according to the motion speed or the motion distance of the motion that is recognized by the motion recognition unit 110.

As described above, the change amount may be controlled by stages or gradually according to the motion speed or the motion distance. As an example, in the case of the channel change, if the motion speed is equal to or higher than the threshold value, the control unit 120 controls the tuner unit 130 to select the next channel by jumping over plural channel units (for example, 5 or 10).

If the broadcasting signal selected through the tuner unit 130 is processed by the signal processing unit 140 and is output through the output unit 150, the user may continuously perform the channel change by taking the next motion as seeing the screen, or may select and view the current channel. For example, if the user, who is viewing channel number 10, intends to select channel 33, the user enters into the motion recognition mode by making the push motion through hands up, and selects channel 33 by performing five motions in total, that is, by performing the motion to rapidly move the hand from right to left twice and performing the motion to move the hand at normal speed from right to left three times. Since the motion is taken 23 times in the related art, the motion control is facilitated.

Since the page shift is performed in the same manner, the detailed description thereof will be omitted.

Figure 3:
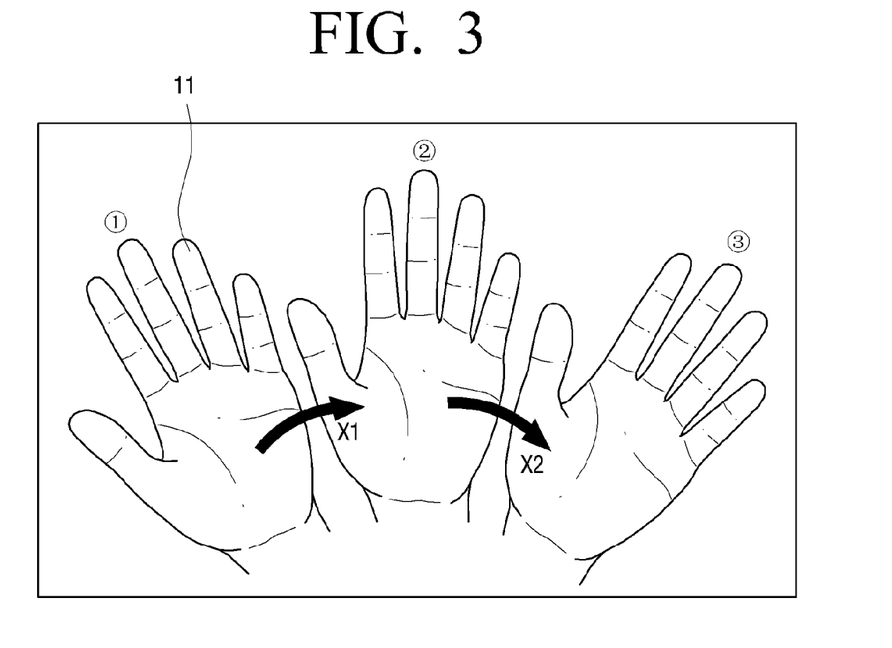
FIG. 3 is a diagram illustrating a process of calculating a motion speed of a moving motion.

FIG. 3 is a diagram illustrating a process of calculating the motion speed of a moving motion. As illustrated in FIG. 3, a user stretches out an object 11, that is, the user's hand, toward the display apparatus 100 and then moves the object 11 in a direction in which the channel change or the page shift is to be performed. This motion is photographed by the photographing unit 111 in the motion recognition unit 110.

If the photographing speed of the photographing unit 111 is 60 Hz, for example, if the object that was in a position ① at the first frame is present in a position ② at the second frame, the moving speed $V_1$ is obtained by dividing the pixels $X_1$ (i.e., the moving distance) by the time 1/60, that is, $V_1=60 X_1$. If the object is present again in a position ③ at the third frame, the moving speed from the position ② to the position ③ is $V_2=60 X_2$. As described above, the control unit can calculate the image change amount by checking the image change amount per frame.

In FIG. 3, the moving distance of the object is calculated in a manner that the current frame and the next frame are divided into a plurality of blocks, a matching block is searched by using an average pixel value or a representative pixel value of respective blocks, and the position moving state of the searched block is confirmed.

Figure 4:
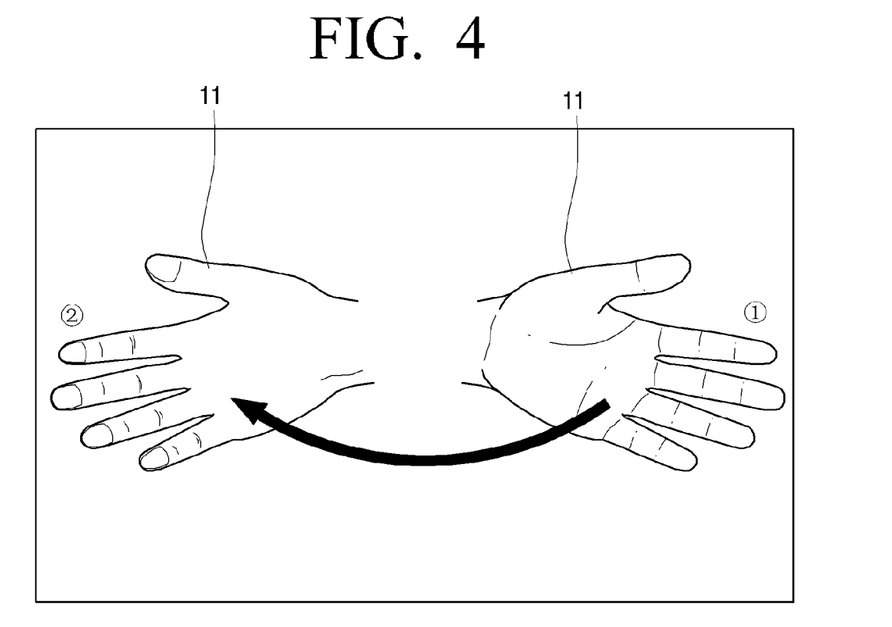
FIG. 4 is a diagram illustrating a process of calculating a motion speed of a swing motion.

FIG. 4 is a diagram illustrating a process of calculating a motion speed of a swing motion. In FIG. 4, a motion in which the palm of the hand is rotated in a state where the palm of the hand is arranged facing toward the display apparatus 100 as indicated by ① and then the back of the hand becomes arranged facing toward the display apparatus 100 as indicated by ②, is illustrated as a swing motion. However, a motion reverse to the above-described motion may correspond to the swing motion. Also, a motion, in which the rotation of the hand is performed in a state where the back of the hand or the palm of the hand does not completely face toward the display apparatus 100, may also be a swing motion.

On the other hand, the moving distance of the object as illustrated in FIG. 3 or 4 may be calculated based on one point of the object. That is, a distance between a center pixel or a center block of pixel groups or blocks that correspond to the object among entire blocks of the current frame and a center pixel or a center block that corresponds to the next frame may be calculated.

Figure 5:
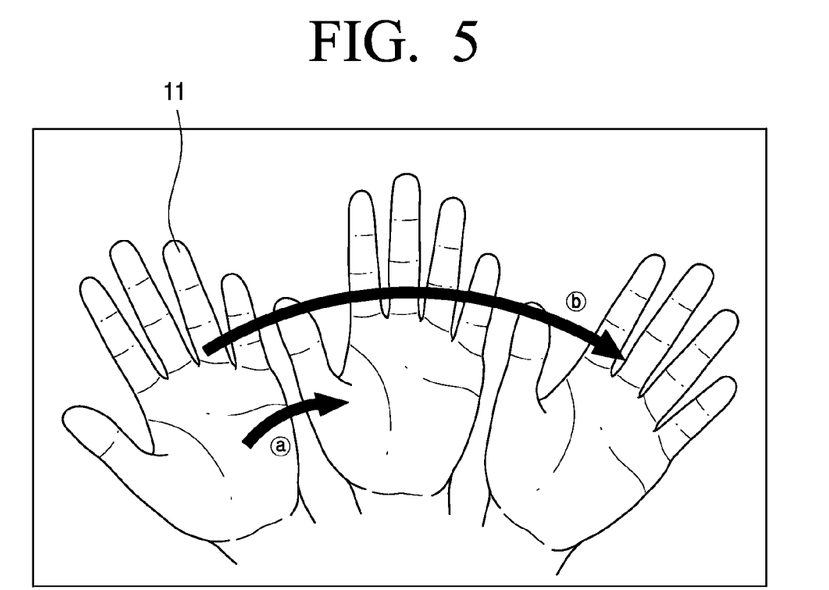
FIG. 5 is a diagram illustrating a process of making the operation performance different by changing a motion distance.

FIG. 5 is a diagram illustrating a process of making the operation performance different by changing a motion distance. As illustrated in FIG. 5, if the object moves for a distance as long as (a) in FIG. 5, the channel or the page is changed as much as the basic unit (e.g., one-by-one), while if the object moves for a distance (b) that is relatively long, the channel or the page is changed as much as the predetermined change amount (e.g., five or greater).

Although the motion speed and the motion distance have been described with different attributes, the motion speed and the motion distance are attributes having substantially considerable relationships. That is, typically, in order to further lengthen the motion distance, users trend toward moving of the object faster. Also, if a unit of time for recognizing one motion is fixed, it is required to move the object at faster speed in order to move the object to the farthest distance within a unit of time. Accordingly, the change amount may be determined in consideration of both the motion speed and the motion distance according to the exemplary embodiments.

On the other hand, the display apparatus 100 may control the operation using other diverse motions.

Figure 6:
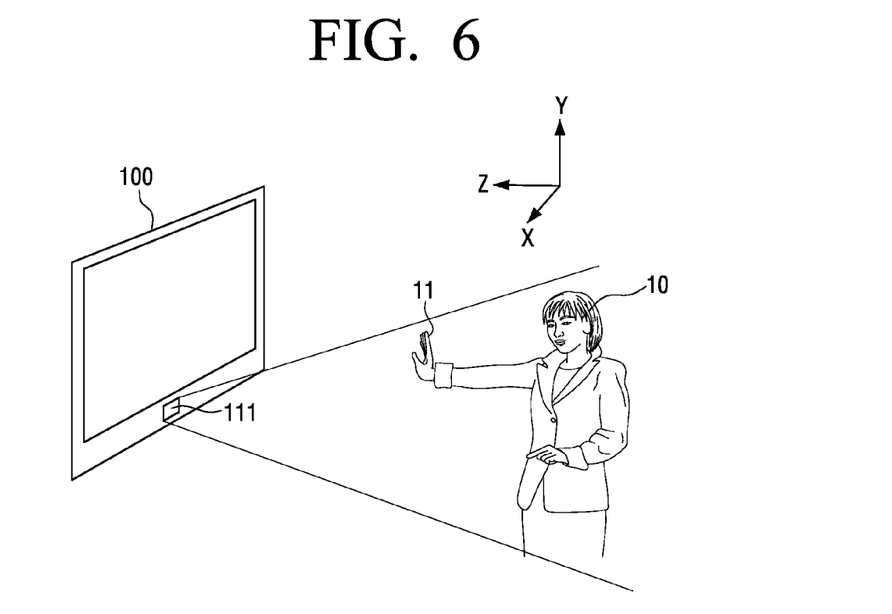
FIG. 6 is a diagram illustrating a push motion for starting a motion recognition mode.

FIG. 6 is a diagram illustrating a push motion that is an example of a motion for starting a motion recognition mode.

The motion recognition unit 110 can recognize the push motion in which one object 11 of the user 10 within a photographing range moves in the direction of the display apparatus 100. Specifically, if a 3D coordinate system is applied to a point where the object is put as illustrated in FIG. 6, a motion can be explained in a Y axis that is arranged toward the upper side of the display apparatus 100, an X axis that is orthogonal to the Y axis and is arranged toward the right side of the display apparatus 100, and a Z axis that is arranged toward the display apparatus 100 from a plane formed by the X axis and the Y axis. The push motion means a motion in the Z-axis direction toward the display apparatus 100.

As described above, since the push motion is a motion in the Z-axis direction, the motion recognition unit 110, in a normal mode, determines whether the push motion has been performed by checking whether the depth information of the photographed image data has been changed (i.e., in the Z-axis direction). Accordingly, if the push motion has been performed and the mode has been shifted to the motion recognition mode, the motion recognition unit 110 analyzes the movement of the object by checking the movement in all directions of Z-axis, X-axis, and Y-axis directions thereafter.

If the push motion is recognized, the control unit 120 determines that the operation is performed in the motion recognition mode, and shifts the current mode to the motion recognition mode. That is, until the push motion is recognized, the control unit 120 operates the control operation in a normal mode, and if a user selection signal according to a user's remote control operation or a key operation of keys provided on a main body of the display apparatus 100 is received through the input unit 160, the control unit 120 performs the corresponding control operation. If the mode is shifted to the motion recognition mode in this state, the control unit 120 recognizes the user's motion, and performs an operation that suits the motion thereafter.

In this case, the control unit 120 recognizes the motion of the corresponding object by tracing the movement of the object that performed an initial push motion, and performs an operation that corresponds to the recognized motion.

In the case where the mode is shifted to the motion recognition mode, the control unit 120 may not accommodate inputs except for the motion. However, in another exemplary embodiment, even in a state where the mode has been shifted to the motion recognition mode, the control unit 120 may also perform the operation according to the key operation if a remote controller or main body key operation is present. That is, the motion recognition mode is not a mode that is controlled only by the motion.

Figure 7:
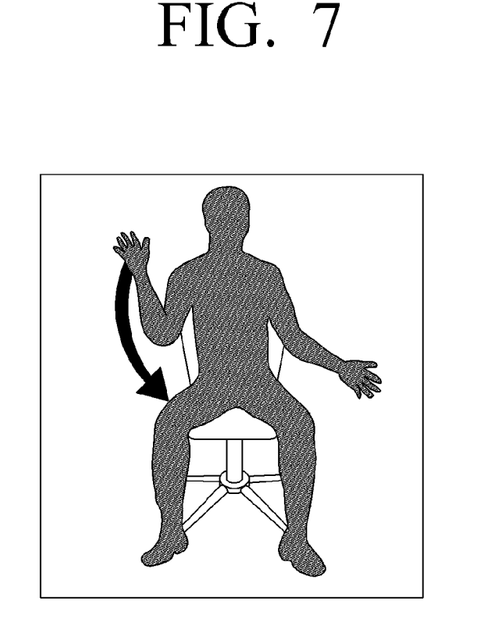
FIGS. 7 and 8 are diagrams illustrating various examples of a finish motion for finishing a motion recognition mode.
Figure 8:
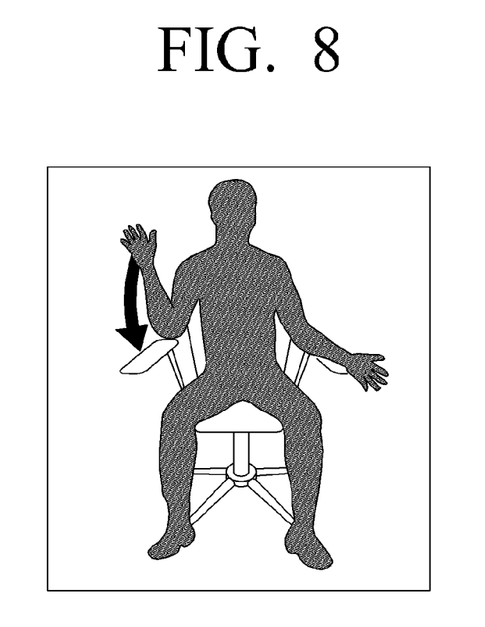

FIGS. 7 and 8 are diagrams illustrating various examples of a finish motion for finishing a motion recognition mode. If a predetermined specified motion is recognized by the motion recognition unit 110, the control unit 120 finishes the motion recognition mode. The motion for finishing the motion recognition mode is called a finish motion hereinafter. The finish motion may be diversely determined. As an example, if the object is the palm of the user's hand, the finish motion may be a motion in which the object comes in contact with the user's body or another object so that the palm of the user's hand is not recognized any further.

FIG. 7 illustrates a case where a motion, in which a user lowers his/her hand 11 and the lowering hand comes in contact with a portion of the user's body such as the user's knee, is used as a finish motion. Also, FIG. 8 illustrates a case where a motion, in which a user lowers his/her hand 11 and the lowering hand comes in contact with an object such as an armrest of a chair, is used as a finish motion. In addition, the finish motion may be determined in diverse forms.

As described above, if the motion recognition mode starts using the push motion and is finished through the hands down action, the user's intention can be understood more conveniently and accurately in performing the motion recognition control. This push motion may include a push-full motion in which a hand is spread forward and then is closed and a push-stop motion in which a hand is spread forward and then is kept in the spread state.

In addition, diverse kinds of motions may be used. That is, a motion to draw a circle or a motion to draw a specified character such as an alphabet may be taken to perform the corresponding operation.

Such a motion to draw a character may be determined by default by a manufacturer or may be registered by a user through the motion recognition unit 110, so that the motion can be used as a motion command of the user only.

Figure 9:
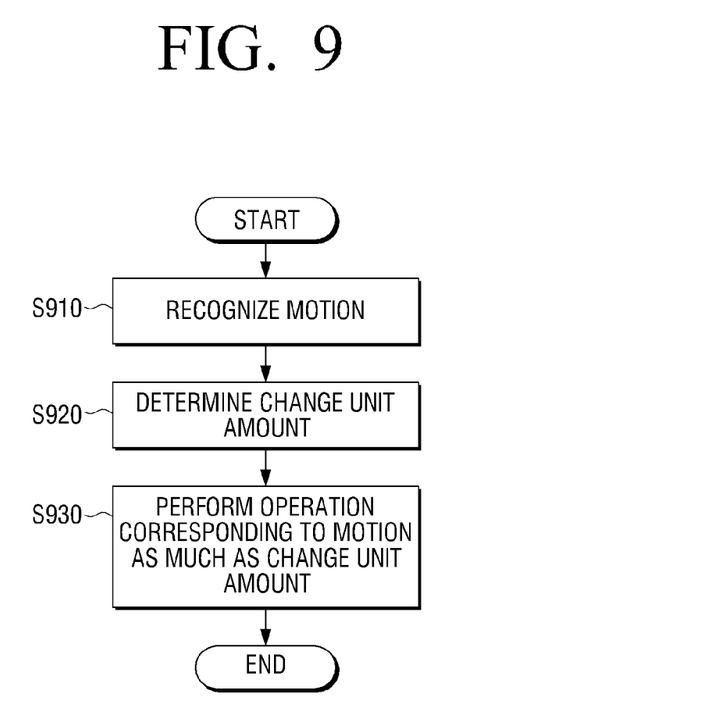
FIGS. 9 and 10 are flowcharts illustrating a motion control method of a display device according to various exemplary embodiments of the present disclosure.

FIG. 9 is a flowchart illustrating a motion control method of a display device according to an exemplary embodiment of the present disclosure.

Referring to FIG. 9, if a motion is recognized (S910), the attribute such as the motion speed or the motion distance of the motion is confirmed and the change amount is determined (S920). Here, the change amount may be determined to be increased by stages through comparison of the change amount with a threshold value as described above or may be determined to be gradually increased in linear proportion to the level of the motion speed or the motion distance.

Then, the operation that corresponds to the motion is performed (S903). For example, in the case of the channel change, the channel change may be performed in channel units of 1, 5, 10, and the like, or may be gradually performed in many channel units, such as 1, 2, 3, . . . , and n according to change amount. Another operation such as volume control may be differently controlled in accordance with the change amount in the same manner.

Figure 10:
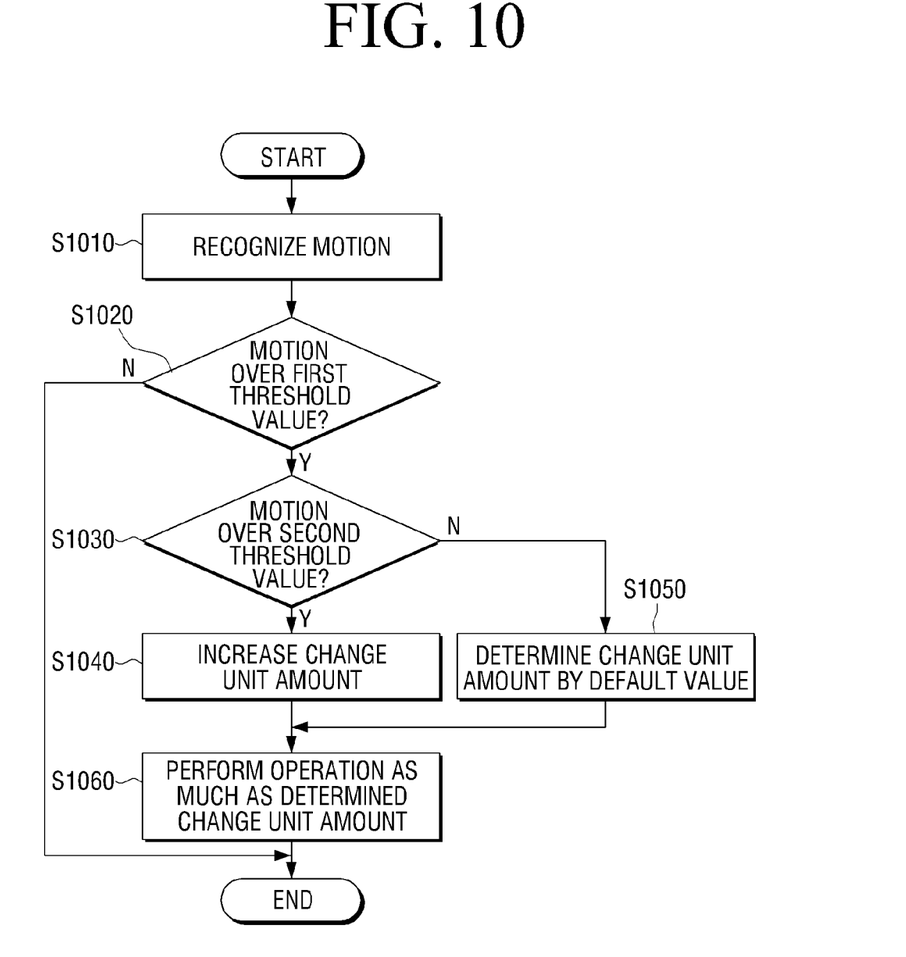

FIG. 10 is a flowchart illustrating a motion control method of a display device in more detail according to an exemplary embodiment of the present disclosure.

Referring to FIG. 10, if motion recognition is performed (S1010), it is determined whether the motion speed or the motion distance is equal to or higher than a first threshold value that is predetermined (S1020). Here, the first threshold value may be differently determined according to the subject of determination. That is, in the case of determining the speed, the first threshold value may be a first threshold speed, and in the case of determining the distance, the first threshold value may be a first threshold distance.

If it is determined that the motion speed or the motion distance is lower than the first threshold value, no separate operation is performed and the motion is disregarded.

On the other hand, if it is determined that the motion speed or the motion distance is equal to or higher than the first threshold value, it is determined whether the motion speed or the motion distance is equal to or higher than the second threshold value (S1030). The second threshold value is set as a value that is higher than the first threshold value.

If it is determined that the motion speed or the motion distance is equal to or higher than the second threshold value, the change amount is increased and the determination continues (S1040). In this case, as described above, the change amount may be determined to be increased by stages, or may be made to be gradually increased in proportion to the difference between the motion speed or the motion distance and the second threshold value.

By contrast, if it is determined that the motion speed or the motion distance is lower than the second threshold value, the change amount is determined by the default value that is the basic unit (e.g., one-by-one) (S1050).

If the change amount is determined as described above, the operation that corresponds to the motion as much as the determined change amount is performed (S1060). The operation performance direction may coincide with the motion direction.

The motions recognized by the motion control method according to the exemplary embodiments may be diverse kinds of motions as illustrated in FIGS. 3 to 8.

Also, FIGS. 9 and 10 are flowcharts illustrating the steps performed after the display apparatus enters into the motion recognition mode. Accordingly, the motion control method according to the above-described exemplary embodiments may further include determining whether the push motion is performed during the operation of the display apparatus in a normal mode, and if the push motion is performed, entering into the motion recognition mode, and finishing the motion recognition mode if the finish motion is recognized.

On the other hand, program codes for performing the above-described motion control method may be stored in diverse types of recording media. Specifically, the program codes may be stored in diverse types of recording media readable by a terminal, such as a RAM (Random Access Memory), a flash memory, a ROM (Read Only Memory), an EPROM (Erasable Programmable ROM), an EEPROM (Electrically Erasable and Programmable ROM), a register, a hard disk, a removable disk, a memory card, a USB memory, a CD-ROM, and the like.

Accordingly, if the recording medium recorded with the above-described program codes is connected to or mounted on a various kinds of devices that can perform motion recognition, the above-described motion control method can be supported.

While certain exemplary embodiments have been shown and described herein, it will be understood by those skilled in the art that various changes in form and detail may be made therein without departing from the spirit and scope of the general inventive concept, as defined by the appended claims.

What is claimed is:

1. A broadcasting signal receiving apparatus comprising:
a display device;
a tuner unit which selects a broadcasting channel;
a signal processing unit which processes a broadcasting signal that is received through the broadcasting channel selected by the tuner unit; and
a camera unit which recognizes a 3D motion of an object that is located outside the display device; and
a control unit which, when the 3D motion of the object is recognized, determines a change amount that varies according to the 3D motion of the object, and performs an operation which corresponds to the 3D motion of the object according to the change amount,
wherein the control unit performs a first operation according to a first change amount when an attribute of the 3D motion is equal to or greater than a predetermined threshold value and performs a second operation according to a second change amount which is different from the first change amount when the attribute of the 3D motion is less than the predetermined threshold value, and
wherein the control unit performs the second operation using a plurality of threshold values that are greater than the predetermined threshold value and different change amounts corresponding to each of the plurality of threshold values.

2. The display apparatus as claimed in claim 1, further comprising:
wherein if a channel-changing motion that instructs a broadcasting channel change is recognized, the control unit controls the tuner unit to change and select the broadcasting channel according to the change amount in a motion direction of the channel-changing motion, wherein the change amount is differently determined according to the motion speed or the motion distance of the channel-changing motion.

3. The display apparatus as claimed in claim 2, wherein the control unit changes the broadcasting channel by the first change amount if the motion speed or the motion distance is equal to or greater than the predetermined threshold value, while the control unit changes the broadcasting channel by the second change amount that is smaller than the first change amount if the motion speed or the motion distance is less than the predetermined threshold value.

4. The display apparatus as claimed in claim 2, wherein the control unit controls the change amount so that the change amount is increased gradually or by stages in proportion to the motion speed or the motion distance of the channel-changing motion.

5. The display apparatus as claimed in claim 1, further comprising an output unit which displays content that includes a plurality of pages;
wherein if a page-shifting motion that instructs a page shift is recognized, the control unit controls the output unit to shift the page according to the change amount in a motion direction of the page-shifting motion, wherein the change amount is differently determined in proportion to the motion speed or the motion distance of the page-shifting motion.

6. The display apparatus as claimed in claim 5, wherein the control unit shifts the content page by the first change amount if the motion speed or the motion distance is equal to or greater than the predetermined threshold value, while the control unit shifts the content page by the second change amount that is smaller than the first change amount if the motion speed or the motion distance is less than the predetermined threshold value.

7. The display apparatus as claimed in claim 5, wherein the control unit controls the change amount so that the change amount is increased gradually or by stages in proportion to the motion speed or the motion distance of the page-shifting motion.

8. A motion control method of a broadcasting signal receiving apparatus, comprising:
recognizing a 3D motion of an object that is located outside the display device;
determining a change amount according to the recognized 3D motion; and
changing a broadcasting channel according to the change amount,
wherein the change amount is differently determined according to amount of the channel-changing motion when the recognized 3D motion is a channel-changing motion for instructing the broadcasting channel change, and
wherein the changing comprises changing the broadcasting channel according to a first change amount when an attribute of the 3D motion is equal to or greater than a predetermined threshold value and changing the broadcasting channel according to a second change amount which is different from the first change amount when the attribute of the 3D motion is less than the predetermined threshold value, and
wherein the changing comprises changing the broadcasting channel using a plurality of threshold values that are greater than the predetermined threshold value and different change amounts corresponding to each of the plurality of threshold values.

9. The motion control method as claimed in claim 8, wherein the performing step changes the broadcasting channel by the first change amount if the motion speed or the motion distance is equal to or greater than the predetermined threshold value, while the performing step changes the broadcasting channel by the second change amount that is smaller than the first change amount if the motion speed or the motion distance is less than the predetermined threshold value.

10. The motion control method as claimed in claim 9, wherein the step of determining the change amount controls the change amount so that the change amount is increased gradually or by stages in proportion to the motion speed or the motion distance of the channel-changing motion.

* * * * *